(12) United States Patent
Grzybowski

(10) Patent No.: US 10,696,515 B2
(45) Date of Patent: Jun. 30, 2020

(54) FOLDABLE WIRE CADDY

(71) Applicant: Dariusz Grzybowski, Des Plains, IL (US)

(72) Inventor: Dariusz Grzybowski, Des Plains, IL (US)

(*) Notice: Subject to any disclaimer, the term of this patent is extended or adjusted under 35 U.S.C. 154(b) by 0 days.

(21) Appl. No.: 16/243,693

(22) Filed: Jan. 9, 2019

(65) Prior Publication Data
US 2019/0241397 A1 Aug. 8, 2019

Related U.S. Application Data

(63) Continuation-in-part of application No. 29/671,771, filed on Nov. 29, 2018.

(60) Provisional application No. 62/625,712, filed on Feb. 2, 2018.

(51) Int. Cl.
| *B65H 75/22* | (2006.01) |
|---|---|
| *B65H 75/40* | (2006.01) |
| *B65H 75/44* | (2006.01) |
| *B60P 3/035* | (2006.01) |
| *B65H 49/38* | (2006.01) |
| *B65D 85/04* | (2006.01) |
| *A47F 7/17* | (2006.01) |

(52) U.S. Cl.
CPC ............ *B65H 75/22* (2013.01); *A47F 7/17* (2013.01); *B60P 3/035* (2013.01); *B65D 85/04* (2013.01); *B65H 49/38* (2013.01); *B65H 75/40* (2013.01); *B65H 75/4465* (2013.01); *B65H 2701/36* (2013.01)

(58) Field of Classification Search
CPC ........ B65H 75/22; B65H 49/38; B65H 75/40; B65H 75/4465; B65H 2701/36; B65H 49/16; B60P 3/035; B65D 85/66; B65D 85/04; B65D 85/672; B65D 85/676; A47B 81/007; A47B 49/002; A47B 63/065; A47F 7/17; A47F 3/085; A47F 5/03
USPC ...... 211/97, 164, 85.5, 44, 78, 85.18, 85.22; 206/702, 389, 391, 394, 53, 393
See application file for complete search history.

(56) References Cited

U.S. PATENT DOCUMENTS

| 849,066 | A | * | 4/1907 | Hahn | B65H 49/32 |
|---|---|---|---|---|---|
| | | | | | 242/594.2 |
| 1,674,768 | A | * | 6/1928 | Dodson | D06F 21/02 |
| | | | | | 211/164 |
| 1,871,179 | A | * | 8/1932 | Joyce | A47F 7/17 |
| | | | | | 242/594.3 |
| 2,705,114 | A | * | 3/1955 | Worsham | B62B 1/264 |
| | | | | | 242/594.4 |
| 2,957,644 | A | * | 10/1960 | Beardslee | B21C 47/28 |
| | | | | | 242/594.6 |

(Continued)

*Primary Examiner* — Jennifer E. Novosad

(57) ABSTRACT

A foldable wire caddy includes a first mounting support, a second mounting support, and a primary mounting bar. The wire reels are positioned along a structural body of the primary mounting bar which is then positioned in between the first mounting support and the second mounting support. A locking screw and a screw-receiving channel of a locking mechanism are used to secure the primary mounting bar in a functional position with the first mounting support and the second mounting support. A carrying handle which is removably and rotatably mounted onto the primary mounting bar allows the foldable wire caddy to be transported from one location to another.

17 Claims, 8 Drawing Sheets

(56) References Cited

U.S. PATENT DOCUMENTS

| | | | | |
|---|---|---|---|---|
| 3,084,803 | A * | 4/1963 | Bayers | A47B 81/007 211/85.5 |
| 3,134,555 | A * | 5/1964 | Baker | H02G 11/02 242/594.3 |
| 3,383,071 | A * | 5/1968 | Godson | B65H 49/321 242/129.6 |
| 3,430,773 | A * | 3/1969 | Hancock | D02H 13/28 211/85.5 |
| 3,784,024 | A * | 1/1974 | Kristy | A47B 49/002 211/131.2 |
| 3,854,509 | A * | 12/1974 | Bailey | B65H 49/38 242/594.3 |
| 3,876,045 | A * | 4/1975 | Knarreborg | B65H 75/40 191/12.2 R |
| 5,007,598 | A * | 4/1991 | Spear | B65H 75/22 137/355.27 |
| 5,056,553 | A * | 10/1991 | Whitehead | B65H 75/22 137/355.27 |
| 5,222,683 | A * | 6/1993 | Blackshire | B65H 49/18 242/129 |
| 5,495,653 | A * | 3/1996 | Schrock | A47F 7/005 206/394 |
| 5,501,325 | A * | 3/1996 | Mehltretter | B65H 49/38 206/303 |
| 5,687,928 | A * | 11/1997 | Lassiter | B65H 49/24 242/129.5 |
| 5,944,280 | A * | 8/1999 | Dimitri | B65H 49/321 242/129.7 |
| 6,170,672 | B1 * | 1/2001 | Boettcher | A47B 81/007 211/13.1 |
| 6,523,776 | B1 * | 2/2003 | Elder | B65H 49/32 211/85.5 |
| 6,523,777 | B2 * | 2/2003 | Gaudio | B65H 49/24 242/594.1 |
| 7,124,674 | B2 * | 10/2006 | Maxey | A47F 13/045 83/649 |
| 7,261,271 | B1 * | 8/2007 | Buswell | B65H 49/321 242/129.7 |
| 7,481,394 | B2 * | 1/2009 | Gleason | B65H 49/32 242/588 |
| 8,016,222 | B2 * | 9/2011 | Galgano | B62B 1/14 242/403 |
| 8,955,699 | B2 * | 2/2015 | Wilder | A47B 49/002 211/77 |
| 9,926,167 | B1 * | 3/2018 | Horne | B65H 49/20 |
| 9,994,416 | B2 * | 6/2018 | Worton | B65H 49/32 |
| 10,065,668 | B2 * | 9/2018 | Runzel | B65H 49/32 |
| 10,124,984 | B1 * | 11/2018 | Garvie | B65H 75/146 |
| 2004/0084084 | A1 * | 5/2004 | Rosine | B65H 75/22 137/355.27 |
| 2006/0038053 | A1 * | 2/2006 | Giovannoni | B65H 49/321 242/557 |
| 2008/0048063 | A1 * | 2/2008 | Wells | B65H 49/32 242/557 |
| 2017/0182720 | A1 * | 6/2017 | Krautkramer | B65H 54/54 |
| 2017/0210590 | A1 * | 7/2017 | Kopp | B65H 75/4465 |
| 2018/0222714 | A1 * | 8/2018 | Garcia | B65H 75/4405 |
| 2018/0251334 | A1 * | 9/2018 | Behrendt | B65H 75/22 |
| 2019/0115742 | A1 * | 4/2019 | Magno | H02G 11/02 |
| 2019/0241397 | A1 * | 8/2019 | Grzybowski | B65H 75/4465 |

* cited by examiner

FOLDABLE WIRE CADDY

The current application claims a priority to the U.S. Provisional Patent application Ser. No. 62/625,712 filed on Feb. 2, 2018.

FIELD OF THE INVENTION

The present invention relates generally to a foldable wire caddy. More specifically, the present invention is a foldable wire caddy that requires minimal storage space. The ability to conveniently assemble and disassemble the components is another benefit of the present invention.

BACKGROUND OF THE INVENTION

A wire caddy is generally used to store and transport electrical wire reels. By using a wire caddy, wire reels can be organized to be accessed as required. Even though existing wire caddies fulfill most of the requirements, these existing wire caddies consist of some notable drawbacks as well.

If a user intends on storing multiple wire reels, the wire caddy needs to be sufficiently sized to accommodate all the wire reels. With a larger sized wire caddy, the space required to store the wire caddy is considerable even when the wire caddy is not holding any wire reels. Moreover, the lack of storage space created due to fixed sized wire caddies can be disadvantageous when travelling.

The complexity involved with assembling and disassembling the wire caddy is another prominent issue. If the process of assembling and disassembling the wire caddy requires a considerable amount of time, the time spent on the wire caddy can negatively affect the overall productivity of the user. Thus, the user may be reluctant to utilize the wire caddy in the future.

The objective of the present invention is to address the aforementioned issues. More specifically, the present invention introduces an apparatus that requires minimum storage area. The ease in assembling and disassembling the present invention is another advantage of the present invention. Since the present invention consists of a minimal number of components, assembling and disassembling can be completed within a short time period.

DETAIL DESCRIPTIONS OF THE INVENTION

All illustrations of the drawings are for the purpose of describing selected versions of the present invention and are not intended to limit the scope of the present invention.

Figure 4A:
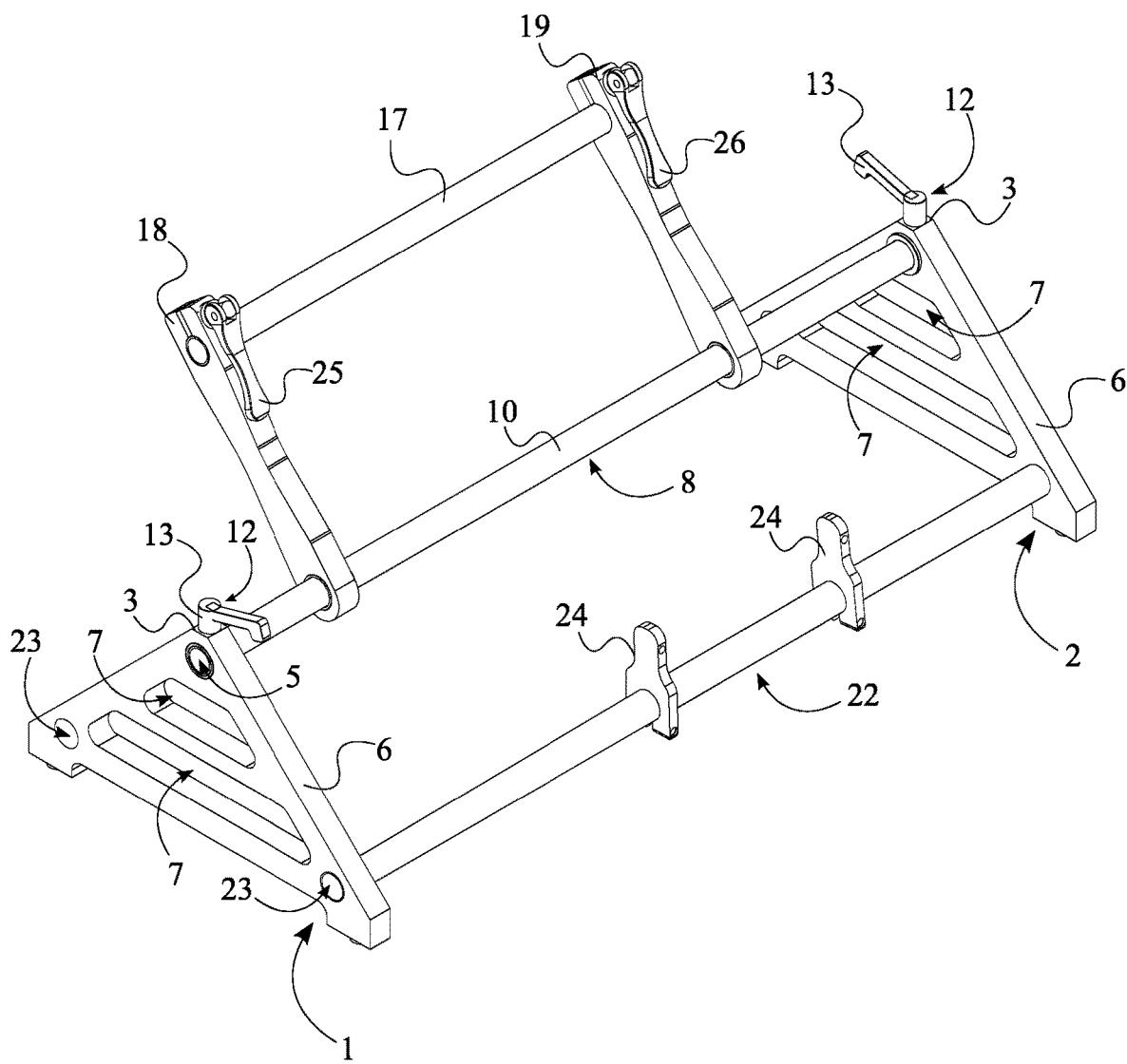
FIG. 4A is a perspective view of the present invention, wherein the carrying handle and the secondary mounting bar are illustrated.
Figure 4B:
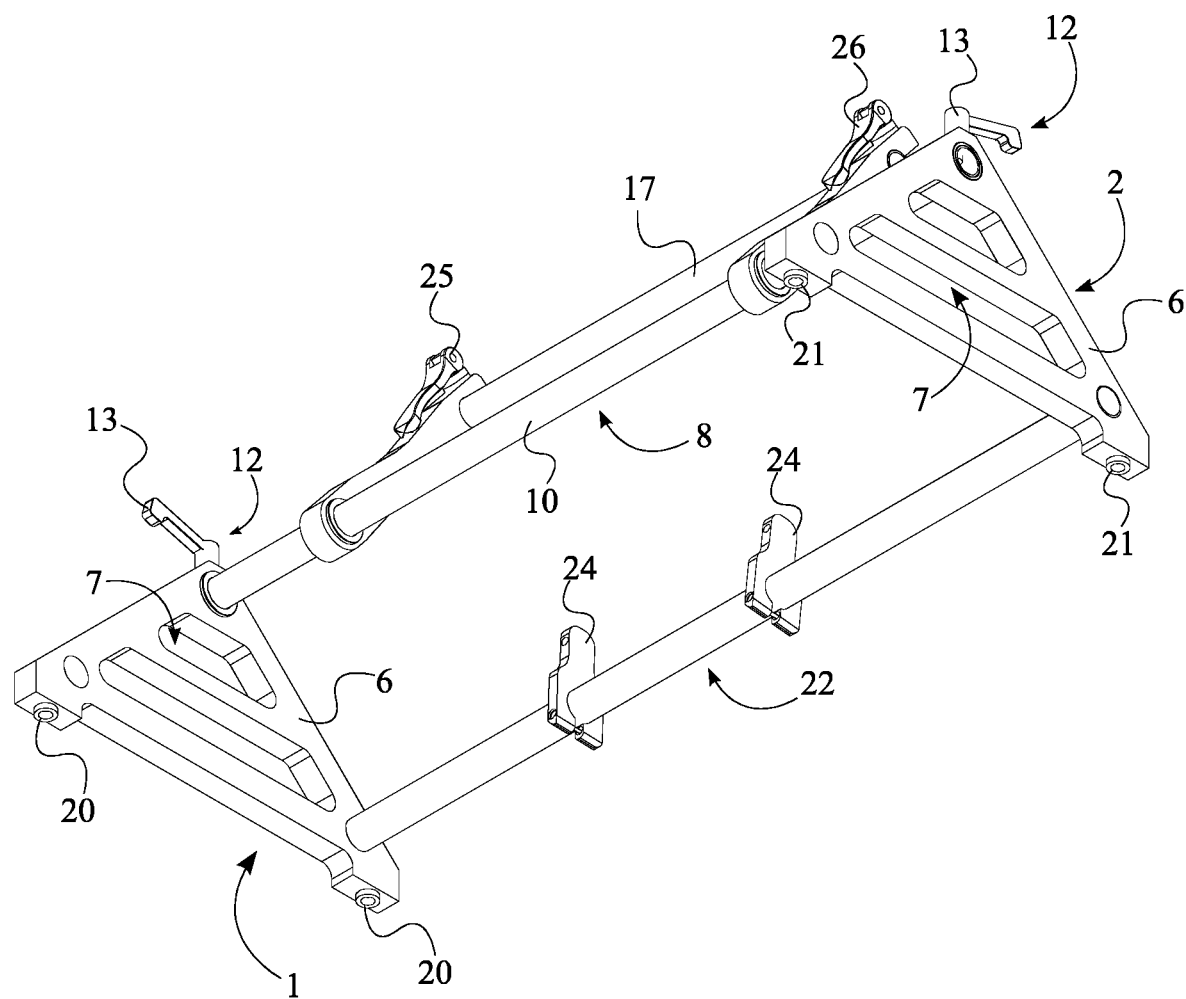
FIG. 4B is a bottom perspective view of the present invention, wherein the secondary mounting bar is inserted into a different secondary bar-receiving aperture.
Figure 5:
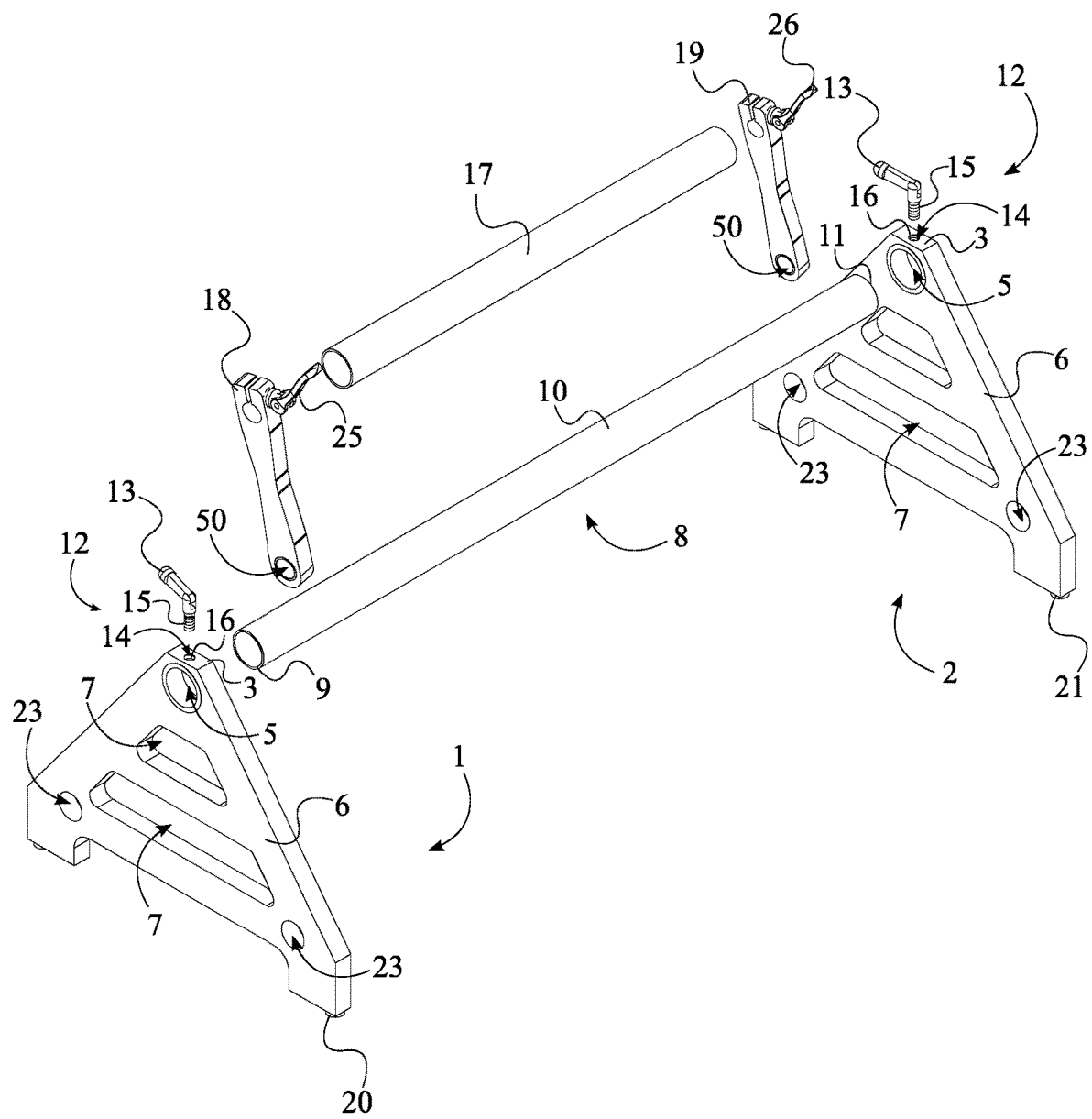
FIG. 5 is an exploded perspective view of the present invention.
Figure 6:
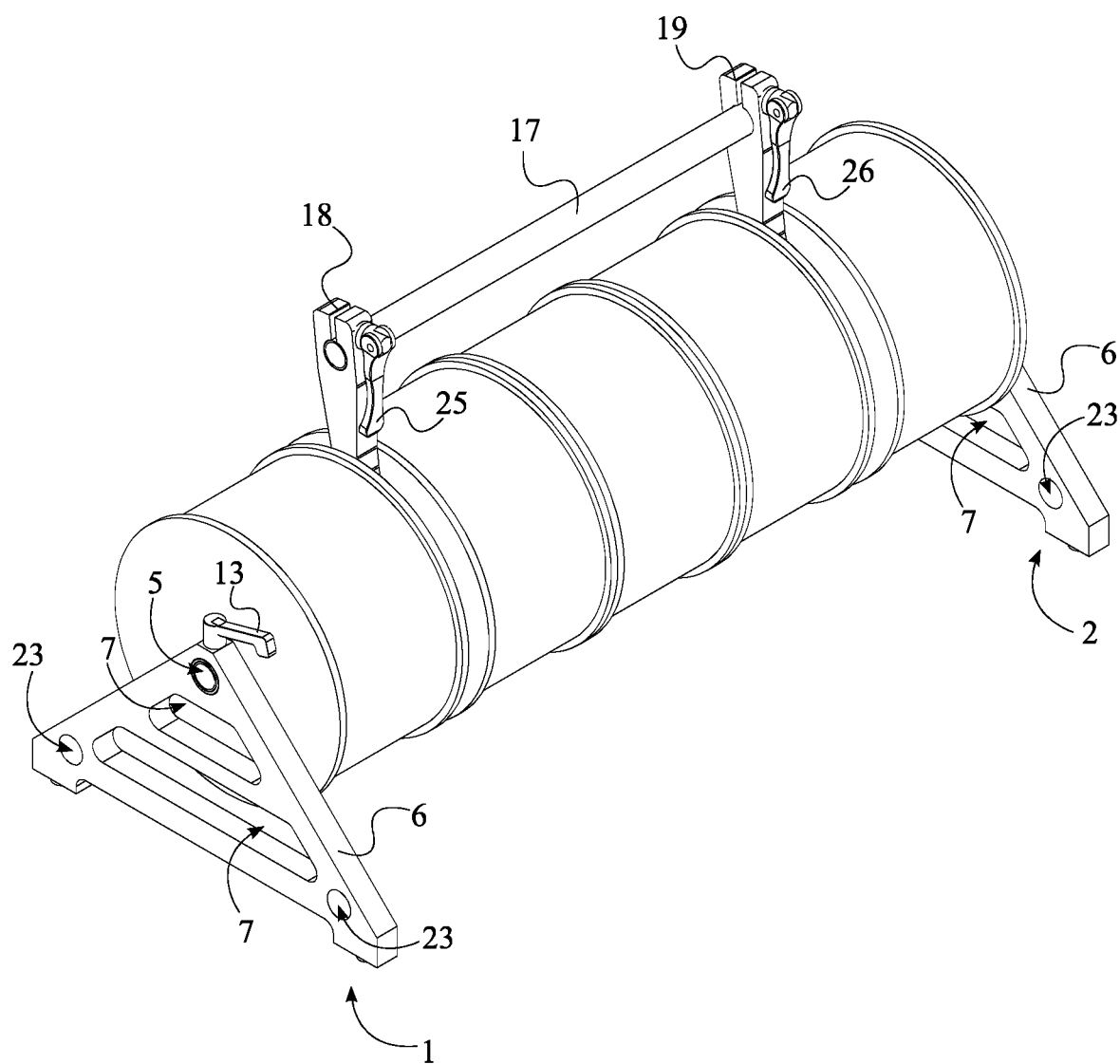
FIG. 6 is a perspective view of the present invention, wherein the carrying handle and a plurality of wire reels are utilized with the present invention.
Figure 7:
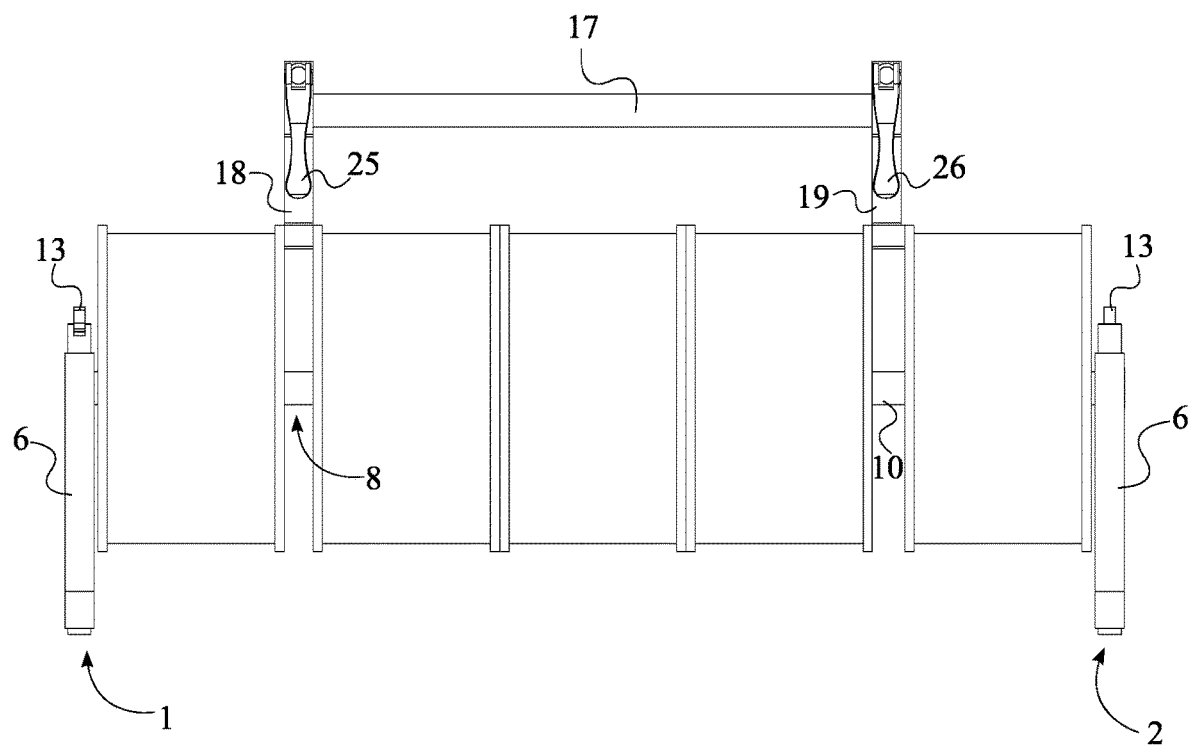
FIG. 7 is a side view of the present invention, wherein the carrying handle and a plurality of wire reels are utilized with the present invention.

As seen in FIGS. 1-7, to fulfill the intended functionalities, the present invention comprises a first mounting support 1, a second mounting support 2, and a primary mounting bar 8. The first mounting support 1 and the second mounting support 2 provide structural support to the present invention. As seen in FIG. 6 and FIG. 7, the primary mounting bar 8, which is positioned with the use of the first mounting support 1 and the second mounting support 2, is used to mount the wire reels used during a wiring project. In the final configuration, the primary mounting bar 8 is positioned in between the first mounting support 1 and the second mounting support 2 which are positioned in parallel to each other.

Figure 1:
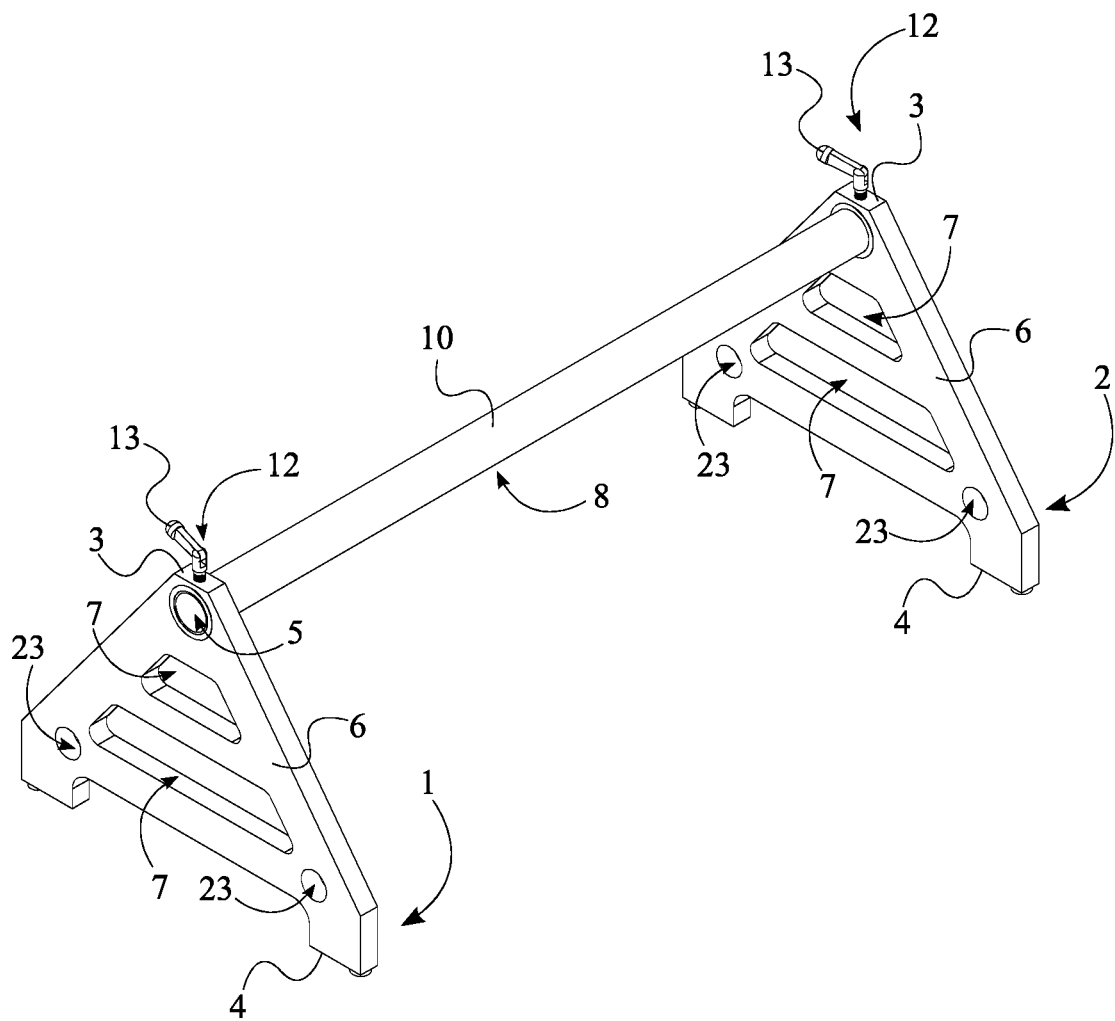
FIG. 1 is a perspective view of the present invention.

The shape and size of both the first mounting support 1 and the second mounting support 2 can vary from one embodiment to another. As seen in FIG. 1, in the preferred embodiment of the present invention, the first mounting support 1 and the second mounting support 2 are triangular in shape. However, in other embodiments of the present invention, the overall shape of the first mounting support 1 and the second mounting support 2 can be different. The first mounting support 1 and the second mounting support 2 each comprise a top end 3, a bottom end 4, a primary bar-receiving aperture 5, a structural body 6, and at least one opening 7. The structural body 6 extends from the top end 3 to the bottom end 4 determining an overall height of both the first mounting support 1 and the second mounting support 2. The structural body 6 of both the first mounting support 1 and the second mounting support 2 can be made of different materials in varying embodiments of the present invention. As an example, in one embodiment of the present invention, the first mounting support 1 and the second mounting support 2 can be made of stainless steel or other comparable material. In another embodiment of the present invention, the first mounting support 1 and the second mounting support 2 can be made of plastic. The primary bar-receiving aperture 5, which is used to mount the primary mounting bar 8, perpendicularly traverses through the structural body 6 adjacent the top end 3 and thus, allows the primary mounting bar 8 to have sufficient clearance from a mounting surface. The distance from the mounting surface to the primary mounting bar 8 is vital in order to position wire reels along the primary mounting bar 8. The at least one opening 7, which functions as a holding point for the first mounting support 1 and the second mounting support 2, perpendicularly traverses through the structural body 6 in between the top end 3 and the bottom end 4. In the resulting position, the at least one opening 7 will be positioned adjacent the primary bar-receiving aperture 5 opposite the top end 3.

As discussed earlier, the wire reels used with the present invention are positioned with the use of the primary mounting bar 8. As seen in FIG. 5, the primary mounting bar 8 comprises a first end 9, a structural body 10, and a second end 11. The structural body 10 of the primary mounting bar 8 extends from the first end 9 to the second end 11 and determines the overall length of the primary mounting bar 8. The overall length of the primary mounting bar 8 can vary in different embodiments of the present invention. In order to utilize wire reels with the present invention, the structural body 10 of the primary mounting bar 8 is slidably positioned into the primary bar-receiving aperture 5 of both the first mounting support 1 and the primary bar-receiving aperture 5 of the second mounting support 2. As seen in FIG. 6 and FIG. 7, when appropriately positioned, the wire reels will be positioned along the structural body 10 of the primary mounting bar 8 in between the first mounting support 1 and the second mounting support 2.

As seen in FIGS. 1-5, in order to secure the position of the primary mounting bar 8 with respect to the first mounting support 1 and the second mounting support 2, the present invention further comprises a locking mechanism 12. The structural body 10 of the primary mounting bar 8 is removably attached at the primary bar-receiving aperture 5 of both the first mounting support 1 and the second mounting support 2 through the locking mechanism 12. The first mounting support 1 and the second mounting support 2 can be positioned at different positions along the structural body 10 of the primary mounting bar 8 via the locking mechanism 12, wherein the locking mechanism 12 can vary in different embodiments of the present invention.

As seen in FIG. 5, in the preferred embodiment of the present invention, the locking mechanism 12 comprises a locking screw 13 and a screw-receiving channel 14, wherein the screw-receiving channel 14 traverses through the top end 3 of the first mounting support 1 and the top end 3 of the second mounting support 2. Furthermore, the screw-receiving channel 14 perpendicularly traverses into the primary bar-receiving aperture 5 of the first mounting support 1 and the second mounting support 2. Thus, by positioning the locking screw 13 into the screw-receiving channel 14, the locking screw 13 can be pressed against the structural body 10 of the primary mounting bar 8. By doing so, the first mounting support 1 and the second mounting support 2 can be positioned at a preferred position along the structural body 10 of the primary mounting bar 8.

The engagement mechanism used to secure the locking screw 13 within the screw-receiving channel 14 can vary from one embodiment to another. As further illustrated in FIG. 5, in the preferred embodiment, the locking mechanism 12 further comprises a first plurality of threads 15 and a second plurality of threads 16, wherein the first plurality of threads 15 is externally distributed along the locking screw 13. To correspond to the first plurality of threads 15, the second plurality of threads 16 is internally distributed along the screw-receiving channel 14. When the primary mounting bar 8 is secured with the locking screw 13 and the screw-receiving channel 14, the first plurality of threads 15 is engaged with the second plurality of threads 16.

A wire caddy is often carried from one worksite to another. As seen in FIGS. 4-7, to provide convenience in carrying, the present invention further comprises a carrying handle 17, a first bar-mounting clamp 18, and a second bar-mounting clamp 19. The first bar-mounting clamp 18 and the second bar-mounting clamp 19 are used to attach the carrying handle 17 to the primary mounting bar 8. To do so, the first bar-mounting clamp 18 is terminally attached to the carrying handle 17 via a first clamping handle 25. On the other hand, the second bar-mounting clamp 19 is terminally attached to the carrying handle 17 opposite the first bar-mounting clamp 18 via a second clamping handle 26. Next, the carrying handle 17 is removably and rotatably attached to the primary mounting bar 8 through the first bar-mounting clamp 18 and the second bar-mounting clamp 19.

As seen in FIG. 5, to rotatably mount the first bar-mounting clamp 18 and the second bar-mounting clamp 19 onto the primary mounting bar 8, both the first bar-mounting clamp 18 and the second bar-mounting clamp 19 each comprise a primary bar-receiving aperture 50. To appropriately position the primary mounting bar 8, the primary bar-receiving aperture 50 of both the first bar-mounting clamp 18 and the second bar-mounting clamp 19 is concentrically aligned with both the primary bar-receiving aperture 5 of both the first mounting support 1 and the second mounting support 2. Thus, the structural body 10 of the primary mounting bar 8 can be positioned through the primary bar-receiving aperture 5 of the first mounting support 1 and the second mounting support 2. Furthermore, the structural body 10 of the primary mounting bar 8 is positioned through the primary bar-receiving aperture 50 of the first bar-mounting clamp 18 and the second bar-mounting clamp 19.

Figure 2:
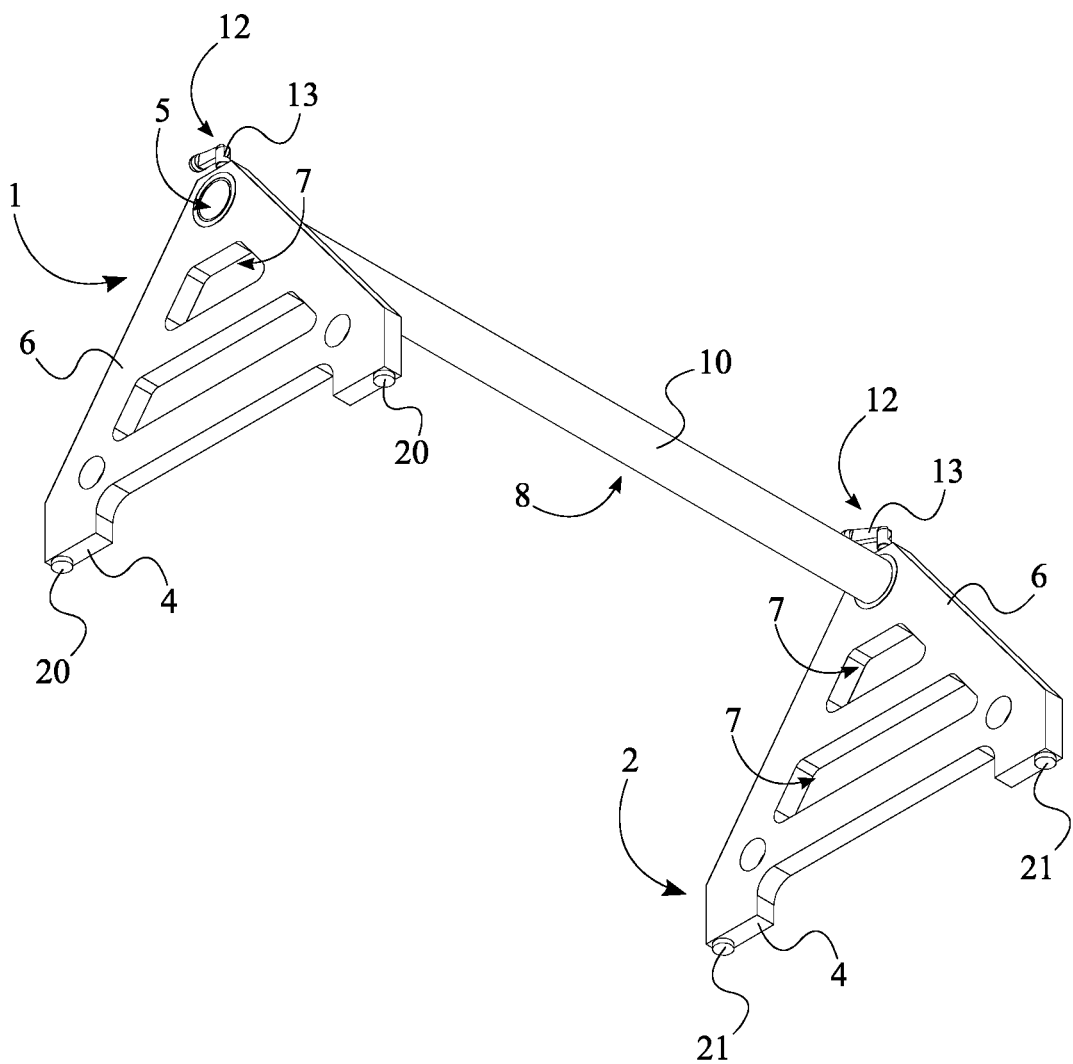
FIG. 2 is a bottom perspective view of the present invention.
Figure 3:
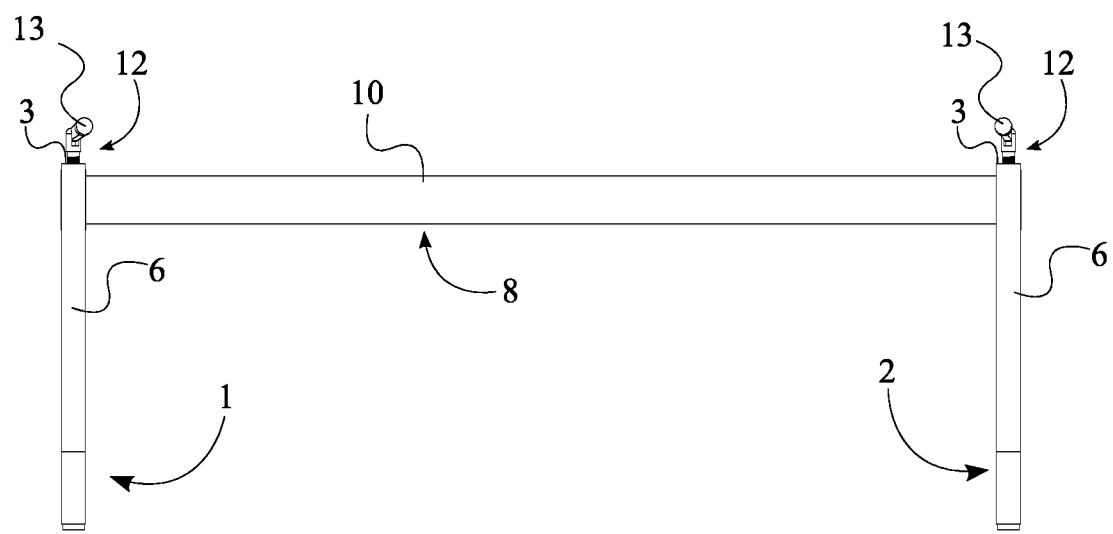
FIG. 3 is a side view of the present invention.

As illustrated in FIG. 2 and FIG. 4B, the present invention further comprises a first plurality of stoppers 20 and a second plurality of stoppers 21 that help the first mounting support 1 and the second mounting support 2 to remain stationary on the mounting surface through friction. To function as intended, the first plurality of stoppers 20 is distributed along the bottom end 4 of the first mounting support 1. Similarly, the second plurality of stoppers 21 is distributed along the bottom end 4 of the second mounting support 2. Thus, when the first mounting support 1 and the second mounting support 2 are positioned perpendicular to the mounting surface, the first plurality of stoppers 20 and the second plurality of stoppers 21 help the first mounting support 1 and the second mounting support 2 to remain stationary by being in contact with the mounting surface. The mounting surface can be, but is not limited to, a carpet floor, a hardwood floor, or a tile floor.

As illustrated in FIG. 4A and FIG. 4B, in some embodiments, the present invention further comprises a secondary mounting bar 22. To position the secondary mounting bar 22, the first mounting support 1 and the second mounting support 2 each further comprise at least one secondary bar-receiving aperture 23. Similar to the primary bar-receiving aperture 5, the at least one secondary bar-receiving aperture 23 perpendicularly traverses through the structural body 6 of both the first mounting support 1 and the second mounting support 2. Preferably, the at least one secondary bar-receiving aperture 23 is positioned adjacent the at least one opening 7 opposite the primary bar-receiving aperture 5. Preferably, the at least one secondary bar-receiving aperture 23 will be positioned adjacent the bottom end 4 of both the first mounting support 1 and the second mounting support 2. Thus, when the structural body 10 of the secondary mounting bar 22 is positioned through the at least one secondary bar-receiving aperture 23 of the first mounting support 1 and the second mounting support 2, the wire reels mounted along the primary mounting bar 8 can be accessed without hinderance.

The secondary mounting bar 22 can be used to carry varying items in different embodiments of the present invention. In another embodiment, when the present invention comprises at least one wire leader 24, the at least one wire leader 24 can be slidably positioned along the structural body 10 of the secondary mounting bar 22 as shown in FIG. 4A and FIG. 4B. The shape and size of the at least one wire leader 24 can vary from one embodiment to another. Moreover, the attachment mechanism utilized to attach the at least one wire leader 24 can also vary from one embodiment to another. When the present invention is being used, the following process flow is generally followed. After the wire reels are positioned along the structural body 10 of the primary mounting bar 8, the first mounting support 1 is appropriately positioned so that the first end 9 of the primary mounting bar 8 can be positioned into the primary bar-receiving aperture 5 of the first mounting support 1. The second mounting support 2 is then appropriately positioned so that the second end 11 of the primary mounting bar 8 can be positioned into the primary bar-receiving aperture 5 of the second mounting support 2. When the primary mounting bar 8 is appropriately positioned, the locking mechanism 12 is used to secure the structural body 10 of the primary mounting bar 8. If the present invention needs to be transported from one location to another, the carrying handle 17 is utilized. If the secondary mounting bar 22 needs to be utilized, a process similar to mounting the primary mounting bar 8 is utilized with the at least one secondary bar-receiving aperture 23 of both the first mounting support 1 and the second mounting support 2. If the first mounting support 1 or the second mounting support 2 needs to be carried from one location to another, the user can do so by grasping the structural body 6 of the first mounting support 1 or the second mounting support 2 at the at least one opening 7.

Although the invention has been explained in relation to its preferred embodiment, it is to be understood that many other possible modifications and variations can be made without departing from the spirit and scope of the invention as hereinafter claimed.

What is claimed is:

1. A foldable wire caddy comprises:
   a first mounting support;
   a second mounting support;
   a primary mounting bar;
   the first mounting support and the second mounting support each comprise a top end, a bottom end, a primary bar-receiving aperture, and a structural body;
   the primary mounting bar comprises a first end, a structural body, and a second end;
   the structural body of each of the first and second mounting supports extending from the top end to the bottom end;
   the primary bar-receiving aperture of each of the first and second mounting supports perpendicularly traversing through the respective structural body adjacent the top end;
   the structural body of the primary mounting bar extending from the first end to the second end;
   the structural body of the primary mounting bar being slidably positioned through the primary bar-receiving aperture of both the first mounting support and the second mounting support;
   a locking mechanism;
   the structural body of the primary mounting bar being removably attached through the primary bar-receiving aperture of both the first mounting support and the second mounting support through the locking mechanism;
   the locking mechanism comprises a locking screw and a screw-receiving channel:
   the screw-receiving channel perpendicularly traversing through the top end of both the first mounting support and the second mounting support and into the primary bar-receiving aperture; and
   the locking screw being removably positioned into the screw-receiving channel.

2. The foldable wire caddy as claimed in claim 1 further comprises:
   the first mounting support and the second mounting support each further comprise at least one opening;
   the at least one opening perpendicularly traversing through the respective structural body in between the top end and the bottom end; and
   the at least one opening being positioned adjacent the respective primary bar-receiving aperture.

3. The foldable wire caddy as claimed in claim 2 further comprises:
   a secondary mounting bar;
   the first mounting support and the second mounting support each further comprise at least one secondary bar-receiving aperture;
   the at least one secondary bar-receiving aperture perpendicularly traversing through the respective structural body;
   the at least one secondary bar-receiving aperture being positioned adjacent the at least one opening opposite the primary bar-receiving aperture; and
   a structural body of the secondary mounting bar being positioned through the secondary bar-receiving aperture of both the first mounting support and the second mounting support.

4. The foldable wire caddy as claimed in claim 3 further comprises:
   at least one wire leader; and
   the at least one wire leader being slidably positioned along the structural body of the secondary mounting bar.

5. The foldable wire caddy as claimed in claim 1 further comprises:
   the locking mechanism further comprises a first plurality of threads and a second plurality of threads;
   the first plurality of threads being externally distributed along the locking screw;
   the second plurality of threads being internally distributed along the screw-receiving channel; and
   the first plurality of threads being engaged with the second plurality of threads.

6. The foldable wire caddy as claimed in claim 1 further comprises:
   a carrying handle;
   a first bar-mounting clamp;
   a second bar-mounting clamp;
   the first bar-mounting clamp being terminally attached to the carrying handle;
   the second bar-mounting clamp being terminally attached to the carrying handle opposite the first bar-mounting clamp; and
   the carrying handle being removably and rotatably attached to the primary mounting bar through the first bar-mounting clamp and the second bar-mounting clamp.

7. The foldable wire caddy as claimed in claim 6 further comprises:
   the first bar-mounting clamp and the second bar-mounting clamp each comprise a primary bar-receiving aperture; and
   the structural body of the primary mounting bar being positioned through the primary bar-receiving aperture of the first mounting support, the first bar-mounting clamp, the second bar-mounting clamp, and the second mounting support.

8. The foldable wire caddy as claimed in claim 1 further comprises:
   a first plurality of stoppers;
   a second plurality of stoppers;
   the first plurality of stoppers being distributed along the bottom end of the first mounting support; and
   the second plurality of stoppers being distributed along the bottom end of the second mounting support.

9. The foldable wire caddy as claimed in claim 1, wherein the first mounting support and the second mounting support are triangular in shape.

10. A foldable wire caddy comprises:
a first mounting support;
a second mounting support;
a primary mounting bar;
a locking mechanism;
the first mounting support and the second mounting support each comprise a top end, a bottom end, a primary bar-receiving aperture, a structural body, and at least one opening;
the primary mounting bar comprises a first end, a structural body, and a second end;
the structural body of each of the first and second mounting supports extending from the top end to the bottom end;
the primary bar-receiving aperture of each of the first and second mounting support perpendicularly traversing through the respective structural body adjacent the top end;
the at least one opening perpendicularly traversing through the respective structural body in between the top end and the bottom end;
the at least one opening being positioned adjacent the respective primary bar-receiving aperture;
the structural body of the primary mounting bar extending from the first end to the second end;
the structural body of the primary mounting bar being slidably positioned through the primary bar-receiving aperture of both the first mounting support and the second mounting support;
the structural body of the primary mounting bar being removably attached through the primary bar-receiving aperture of both the first mounting support and the second mounting support through the locking mechanism;
the locking mechanism comprises a locking screw and a screw-receiving channel;
the screw-receiving channel traversing through the top end of both the first mounting support and the second mounting support and into the respective primary bar-receiving aperture; and
the locking screw being removably positioned into the screw-receiving channel.

11. The foldable wire caddy as claimed in claim 10 further comprises:
the locking mechanism further comprises a first plurality of threads and a second plurality of threads;
the first plurality of threads being externally distributed along the locking screw;
the second plurality of threads being internally distributed along the screw-receiving channel; and
the first plurality of threads being engaged with the second plurality of threads.

12. The foldable wire caddy as claimed in claim 10 further comprises:
a carrying handle;
a first bar-mounting clamp;
a second bar-mounting clamp;
the first bar-mounting clamp being terminally attached to the carrying handle;
the second bar-mounting clamp being terminally attached to the carrying handle opposite the first bar-mounting clamp; and
the carrying handle being removably and rotatably attached to the primary mounting bar through the first bar-mounting clamp and the second bar-mounting clamp.

13. The foldable wire caddy as claimed in claim 12 further comprises:
the first bar-mounting clamp and the second bar-mounting clamp each comprise a primary bar-receiving aperture; and
the structural body of the primary mounting bar being positioned through the primary bar-receiving aperture of the first mounting support, the first bar-mounting clamp, the second bar-mounting clamp, and the second mounting support.

14. The foldable wire caddy as claimed in claim 10 further comprises:
a first plurality of stoppers;
a second plurality of stoppers;
the first plurality of stoppers being distributed along the bottom end of the first mounting support; and
the second plurality of stoppers being distributed along the bottom end of the second mounting support.

15. The foldable wire caddy as claimed in claim 10 further comprises:
a secondary mounting bar;
the first mounting support and the second mounting support each further comprise at least one secondary bar-receiving aperture;
the at least one secondary bar-receiving aperture perpendicularly traversing through the respective structural body;
the at least one secondary bar-receiving aperture being positioned adjacent the at least one opening opposite the primary bar-receiving aperture; and
a structural body of the secondary mounting bar being positioned through the secondary bar-receiving aperture of both the first mounting support and the second mounting support.

16. The foldable wire caddy as claimed in claim 15 further comprises:
at least one wire leader; and
the at least one wire leader being slidably positioned along the structural body of the secondary mounting bar.

17. The foldable wire caddy as claimed in claim 10, wherein the first mounting support and the second mounting support are triangular in shape.

* * * * *